United States Patent [19]
Lutz

[11] Patent Number: 5,686,808
[45] Date of Patent: Nov. 11, 1997

[54] UNIVERSAL BATTERY CHARGER AND METHOD

[76] Inventor: Frank T. Lutz, 1354 Sea Village Dr., Cardiff, Calif. 92007

[21] Appl. No.: 454,703

[22] Filed: May 31, 1995

[51] Int. Cl.$^6$ .......................... H01M 10/46; H01M 10/44
[52] U.S. Cl. ........................ 320/2; 320/15; 320/35
[58] Field of Search .................................. 320/2, 32, 35, 320/5, 20, 15

[56] References Cited

U.S. PATENT DOCUMENTS

| | | | |
|---|---|---|---|
| 3,852,652 | 12/1974 | Jasinski. | |
| 5,162,719 | 11/1992 | Tomura et al. | 320/2 |
| 5,280,229 | 1/1994 | Faude et al. | 320/2 |
| 5,283,511 | 2/1994 | Keener et al. | 320/2 |
| 5,489,836 | 2/1996 | Yuen | 320/32 |

*Primary Examiner*—Peter S. Wong
*Assistant Examiner*—Patrick B. Law
*Attorney, Agent, or Firm*—Finnegan, Henderson, Farabow, Garrett & Dunner, L.L.P.

[57] ABSTRACT

Apparatus for charging a battery includes a charger main body having a docking station with a docking bed and programmable electronics, which includes an array of programming contacts exposed at the docking bed, and a docking tray mountable on the docking bed. The docking tray has electrical contacts for interconnecting with at least one type and size of battery and an array of contactors connected with the electrical contacts, which contact selected ones of the programming contacts, and include associated circuitry on the tray to program the electronics for charging of the battery. Further, a method provides the steps of using a tray or a bed of the main charger body to engage contactors exposed on the tray with contacts exposed on the bed and connected to the circuitry of the main charger body, determining charging parameters for charging a battery of a particular type and size using charging circuitry in the tray complementary to the circuitry of the main charger body, connecting the battery to be charged to the circuit of the tray, and executing an automatic charging process.

32 Claims, 8 Drawing Sheets

| STATUS INDICATORS | | |
|---|---|---|
| STATUS | LED 1 | LED 2 |
| BATTERY ABSENT | OFF | OFF |
| CHARGE PENDING, DISCHARGING | OFF | ON-OFF @4HZ |
| FAST CHARGING | OFF | ON |
| CHARGE COMPLETE | ON | OFF |

# 5,686,808

UNIVERSAL BATTERY CHARGER AND METHOD

BACKGROUND OF THE INVENTION

1. Field of the Invention

The present invention relates to a method and apparatus for charging rechargeable batteries, such as sealed nickel-cadmium, nickel-metal-hydride and lithium-ion batteries, quickly and safely.

2. Description of the Related Art

In only eight years, the evolving market for battery-powered computers, peripherals, cellular phones and electronic imaging devices has grown to more than $30 billion annually. As fifth and sixth generation variants of these products are introduced, even formerly desk-bound machines are joining the cordless brigade. Today, a complete mobile office/workstation—from computer and reference library to wireless communication center—can be assembled in an average size briefcase.

Manufacturing electronic devices smaller and cordless, however, does not necessarily make them portable. Because of battery capacity, equipment run-times are normally less than three hours. Battery charging times range from five to sixteen hours. Moreover, each device typically has required its own dedicated battery and charger.

Simple arithmetic shows the need for at least three batteries to power a piece of equipment for one eight-hour day. On subsequent days, cordless operating time is limited by the number of batteries that can be charged between work sessions.

When the size and weight penalty imposed by multiple spare batteries and chargers is combined with a disparate ratio of charge-time to run-time and the constant need for nearby AC outlets, true portability remains more an idealistic goal than a practical reality.

Significantly better batteries (lithium-ion, lithium-polymer, zinc-air, etc.) are still several years away from general use. Replacing NiCd (nickel-cadmium) batteries with higher energy NiMH (nickel-metal-hydride) types increases cordless running times but only at the expense of proportionally longer charging times. Incremental advances in component energy efficiency and power management strategies are quickly offset by the migration of even more devices from desk top to briefcase.

There are presently more than 100 unique batteries for portable computers. Cellular phones account for another two dozen battery configurations—some with three or four separate power ratings. Camcorder makers have standardized on only six battery sizes, but these too come in multiple power ratings. At least ten varieties of individual NiCd and NiMH cells are commonly used in photographic equipment, games, appliances and hundreds of other applications.

A dedicated charger for each of these batteries, or even for each type of these batteries, becomes economically and physically prohibitive. Likewise, adaptability to different AC and DC charging power sources is frequently lacking.

One of the reasons for the proliferation of chargers is that prior art chargers are product-specific with added constraints on size, speed, power supply and compatibility with various battery chemistries.

Slow (Trickle) chargers, the kind supplied with most appliances and cost-sensitive consumer products, take up to 16 hours to recharge a battery and longer for premium batteries, which a user frequently buys as spares. Not only must users carry an AC adapter (wall cube) for each battery-powered device, they must also schedule their activities around access to AC outlets.

Quick (3–5 hour) chargers are typically used for alkaline-replacement-size (AA, C, D, etc.) individual NiCd cells and for multi-cell batteries for short run-time equipment, such as power tools, computers and camcorders. Because quick chargers terminate charging based on time alone, fully discharged batteries are often undercharged while partially discharged batteries are often overcharged at excessive current levels. This action radically shortens battery life. Like slow chargers, quick chargers are usually AC powered.

Fast (less than 1 hour) and ultra-fast (less than ½ hour) chargers are still a rarity. Those that do exist are dedicated to one type of battery or pack, will not fit in a briefcase and will often charge the battery in an abusive manner that causes premature failure. Fast chargers may be powered by either a car battery and/or an AC outlet.

Whichever charging speed is chosen, both the power source and the charger must deliver the requisite voltage and current in a reasonably portable package. Fast charging of high capacity batteries (more than 10 watt-hour) makes the efficiency of high frequency switch-mode operation an almost imperative choice for the charger's design and also for the power supply if AC powered.

Charging power, however, is but one third of recharging requirements. Equally important is a control system that completes the charging at precisely the point where the battery reaches its peak dischargeable capacity. This point is a moving target that becomes even more elusive when one charger must charge both NiCd and NiMH batteries. Although charging regimens for NiCd and NiMH batteries are generally similar, extracting maximum performance from NiMH batteries requires more precise control of charge termination and trickle current.

The basic problem in determining the proper peak charge point is communication between charger and battery. Charging is a chemical reaction that can only be measured indirectly via input current, cell terminal voltage or case temperature. All three parameters interact and their measured values vary with both time and ambient temperature. This makes the instantaneous value of any one parameter an unreliable determinant for control purposes.

To circumvent the absence of accurate absolute values, most NiCd fast chargers terminate charging based on the rate of change of the battery voltage ($\delta V/\delta t$). NiCd and, to a lesser extent, NiMH batteries have rising $\delta V/\delta t$, near maximum charge, that subsequently peaks, drops slightly and then becomes zero, i.e., maintains a constant voltage. A charge termination decision based on negative $\delta V/\delta t$ ("$\delta V$") is normally adequate for NiCd batteries but will overcharge NiMH batteries.

Zero $\delta V/\delta t$ ($0\delta V$) detection works with both NiCd and NiMH batteries, but electrical noise and/or power interruptions frequently cause premature charge termination. Contemporary charger designs often compensate for this possibility by setting the charge maintenance or trickle current at a value that will continue charging after fast charge termination. The result is consistent overcharging, which in turn results in shorter battery life—especially for NiMH batteries.

Because NiMH batteries are presently more sensitive to damage from overcharging, NiMH battery manufacturers have unanimously endorsed a third, two-stage charge termination regimen. Fast charging is terminated at approximately 95% of full capacity based on the rate of change of the temperature of the battery ($\delta T/\delta t$). The battery is then "topped-off" at a pulsed rate equal to ⅛ the fast charge rate. This method assures a fully charged battery without overcharging. An example of such a charger including a differentiation circuit is described in U.S. Pat. No. 3,852,652, issued Dec. 3, 1974 to Leon Jasinski.

Although NiCd and NiMH batteries exhibit nonlinear but repeatable voltage and temperature characteristics while being charged, Li-ion (lithium-ion) batteries do not. Also, the preferred method for charging Li-ion batteries is constant voltage as opposed to the constant current method used with NiCd and NiMH batteries. Because of these traits, Li-ion batteries require yet another charging regimen that charges the battery via a current-limited, voltage-regulated source for a specified period of time. Temperature and voltage are sensed only as absolute limits indicating fault conditions.

Implementation of any of the foregoing charging regimens normally requires an electromechanical connection between the battery and charger which is dedicated to that single type of battery. In the future, a dedicated external charger for every new type and configuration of portable battery will not be economically feasible.

SUMMARY OF THE INVENTION

According to the invention, it has been recognized that the above discussed problems can be solved by an apparatus and a method as follows.

The apparatus, according to the invention, includes a charger main body having a docking station, which includes a docking bed and programmable electronics having an array of contacts exposed at the docking bed. A docking tray engageable with the docking bed includes a pair of electrical contacts for connecting to the battery to be charged and further includes an of contactors at least two of which are connected to the pair of electrical contacts. The array of contactors and associated circuitry are arranged on an exterior surface of the tray to contact the exposed contacts of the docking bed for programming the electronics to charge the battery.

According to a preferred embodiment of the invention, adaptability to a plurality of different batteries is provided by a plurality of different docking trays that are portable with the charger main body.

According to a feature of the preferred embodiment, adaptability to a plurality of different types of batteries and to different application requirements with respect to recharging is provided by a corresponding plurality of docking trays, each with its own associated circuitry.

According to another feature of the preferred embodiment of the invention, the programmable electronics includes circuitry programmable for charging with means on the docking tray for sensing battery temperature and measuring the rate of change of battery temperature with respect to time ($\delta T/\delta t$).

The preferred embodiment includes circuitry for two-stage $\delta T/\delta t$ charging and also circuitry for $0\delta V$ detection as an active alternative or backup, as well as circuitry for detection of charging threshold voltage and for maximum cell temperature, voltage and charge time.

According to the invention, a method for charging a battery with a charger having a charger main body with charging circuitry having elements usable for charging a plurality of batteries of different types and sizes comprises the steps of engaging a tray with the bed of the charger main body to engage contactors exposed on the tray with contacts exposed on the bed and connected to the circuitry of the charger main body in which the tray includes charging circuitry complementary to the circuitry of the charger main body and adapted to determine charging parameters for charging a battery of a particular type and size; then connecting the battery to be charged to the circuit of the tray; and executing an automatic charging process. Advantageously, a docking tray for any battery configuration can be mounted, without tools, quickly.

More specifically, a method of rapidly charging a battery comprises the steps of sensing the external temperature of the battery and producing from this temperature an electrical signal representative of the rate of change of the sensed temperature, applying a charging current of a first level to the battery as long as the rate of change of the produced electrical signal remains below a predetermined value and reducing the charging current when the electrical signal exceeds the predetermined value; determining the first level of charging current and reducing the charging current in dependence upon particular circuitry; and, with the particular circuitry being mounted on a docking tray, the docking tray being engageable with a charger main body having a docking station including a docking bed with a plurality of exposed contacts, the docking tray having an array of contactors engageable with the plurality of contacts, engaging the docking tray with the docking bed.

Further, according to a preferred embodiment of this method, a discharge-before-charge function is executed by supervisory electronics in the main body of the docking station for treating certain NiCd ailments commonly referred to as the "memory effect", the remainder of the charging process being automatic.

Additional features and advantages of the invention will be set forth in part in the description which follows and in part will be obvious from the description or may be learned by practice of the invention. The advantages of the invention will be realized and attained by means of the elements and combinations particularly pointed out in the appended claims.

It is to be understood that both the foregoing general description and the following detailed description are exemplary and explanatory only and are not restrictive of the invention as claimed.

The accompanying drawings, which are incorporated in and constitute a part of this specification, illustrate preferred embodiments of the apparatus and method according to the invention and, together with the description, serve to explain the principles of the invention.

DESCRIPTION OF THE PREFERRED EMBODIMENT

Reference will now be made in detail to a preferred embodiment of the invention, an example of which is illustrated in the accompanying drawings. Wherever possible, the same reference numbers will be used throughout the drawings to refer to the same or like parts.

In accordance with the present invention, there is provided a charger main body having a docking station with a docking bed and programmable electronics, which include an array of programming and charging contacts exposed at the docking bed. A docking tray is mountable on the docking bed, the docking tray including having electrical contacts interconnecting with at least one type and size of battery. It further includes an array of contactors connected with the electrical contacts, contacting the programming contacts of the docking station, and having associated circuitry, all to program the electronics for charging of the at least one type and size of battery.

The method of the invention includes the steps of engaging a tray with the docking bed of the charger main body to engage contactors exposed on the tray with contacts exposed on the bed and connected to the circuitry of the charger main body; connecting a battery of a particular type and size to be charged to the circuit of the tray, which tray includes charging circuitry complementary to circuitry of the charger main body and selected to determine charging parameters for charging a battery; and then executing an automatic charging process.

Figure 1:
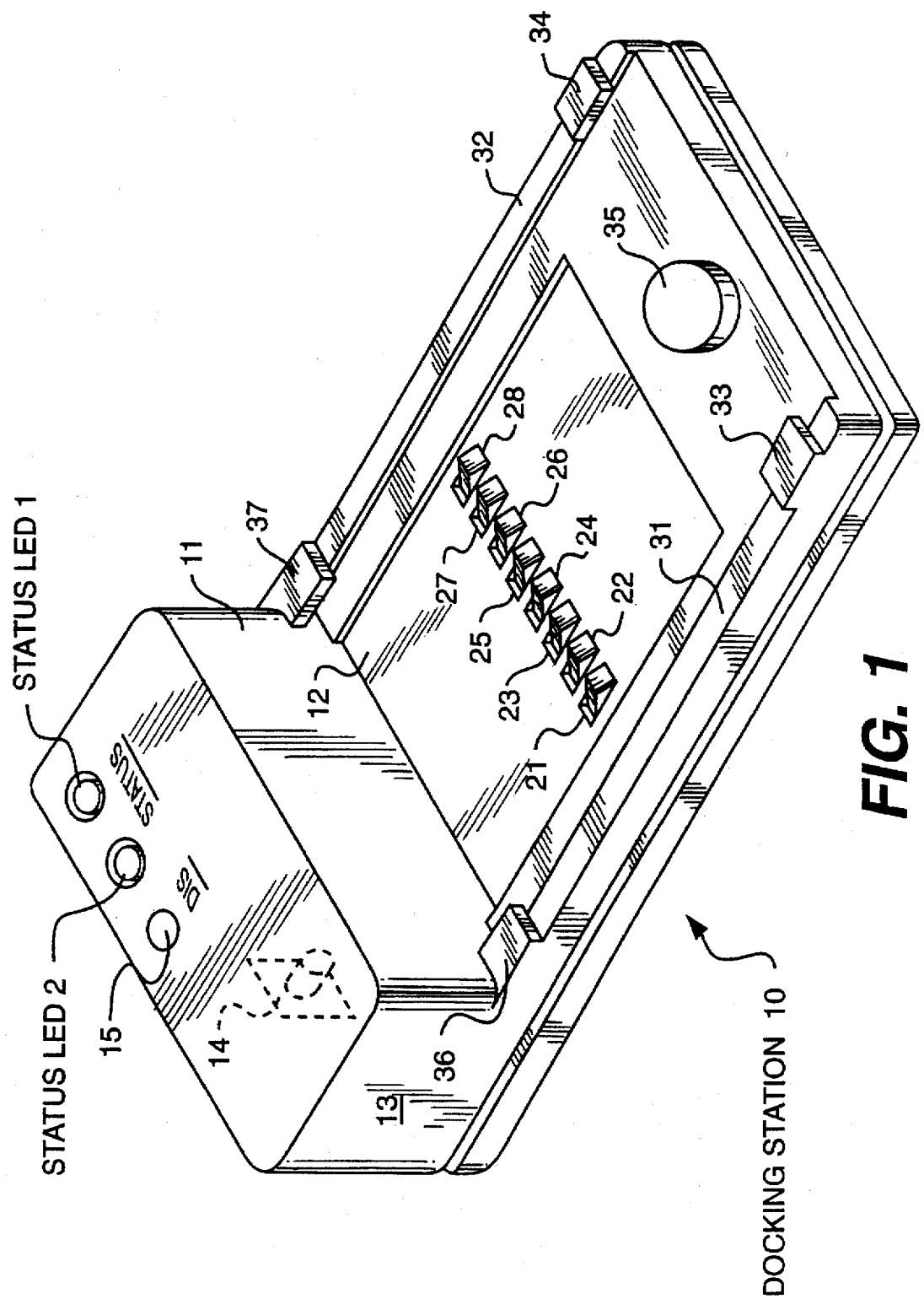
FIG. 1 is a perspective view of a battery charger according to the invention with docking tray removed.

In the illustrative embodiment of FIG. 1, a docking station 10 includes a battery charger main body 11 with a docking bed 12. The thicker portion of the charger main body 11 includes the major portion of charge control electronics 13, which are shown in detail in FIG. 4. A DC input jack 14 provides the power entry point for the electronics 13. The charge control electronics 13 have external controls and indicators at the docking station 10, such as the push switch 15, which controls a discharge-before-charge cycle as selected by the user, the status light-emitting diodes LED1 and LED2 and further external portions in the docking bed 12, as illustrated by the adapter interface contacts 21–28.

The charger main body 11 further includes adapter guide rails 31 and 32, retaining tabs 33, 34, 36, and 37 and the spring-loaded adapter latch 35.

Figures 2, 6:
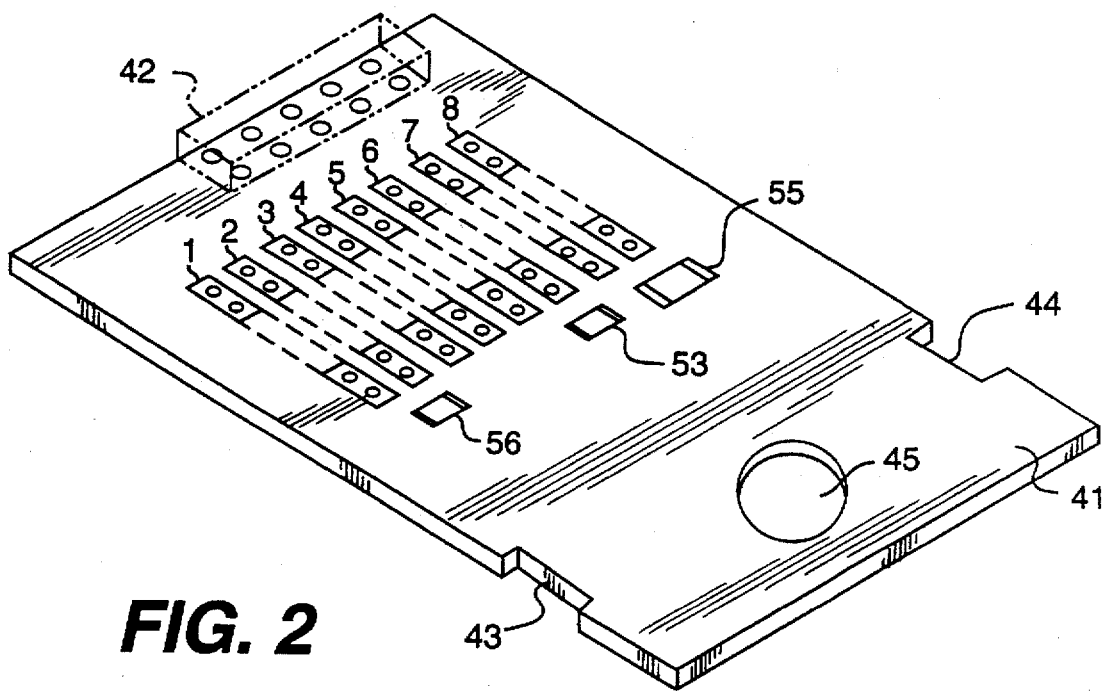
FIG. 2 is a perspective view of the top side of docking tray according to the invention with battery holder removed.
FIG. 6 is a logic diagram for the status indicator lights.

The docking tray 41 is attached by positioning the docking tray 41 between the guide rails 31 and 32 and, with the docking tray notches 43 and 44 aligned with retaining tabs 33 and 34, applying a downward force to the docking tray sufficient for the tray 41 to compress the adapter latch 35 and docking bed contacts 21–28 and then sliding the docking tray's edges under the retaining tabs 33, 34, 36 and 37 until the spring-loaded latch 35 of FIG. 1 engages the latch mating hole 45 in the docking tray 41 of FIG. 2. Removing the docking tray 41 is accomplished by depressing the spring-loaded latch 35 while simultaneously sliding the docking tray 41, in a direction opposite that used for engagement, until its edges are released from under retaining tabs 33, 34, 36 and 37.

In FIG. 2, the adapter or docking tray 41 is configured to engage snugly with docking bed 12 of the charger main body 11. Docking tray 41 includes a battery connector 42, which, while indicated only schematically, preferably also includes a mechanical means for holding the battery to be charged. Eight interface contact pads or connectors 1–8 are on the underside of docking tray 41. They are positioned to contact adapter interface contacts 21–28 in docking bed 12.

Figure 3:
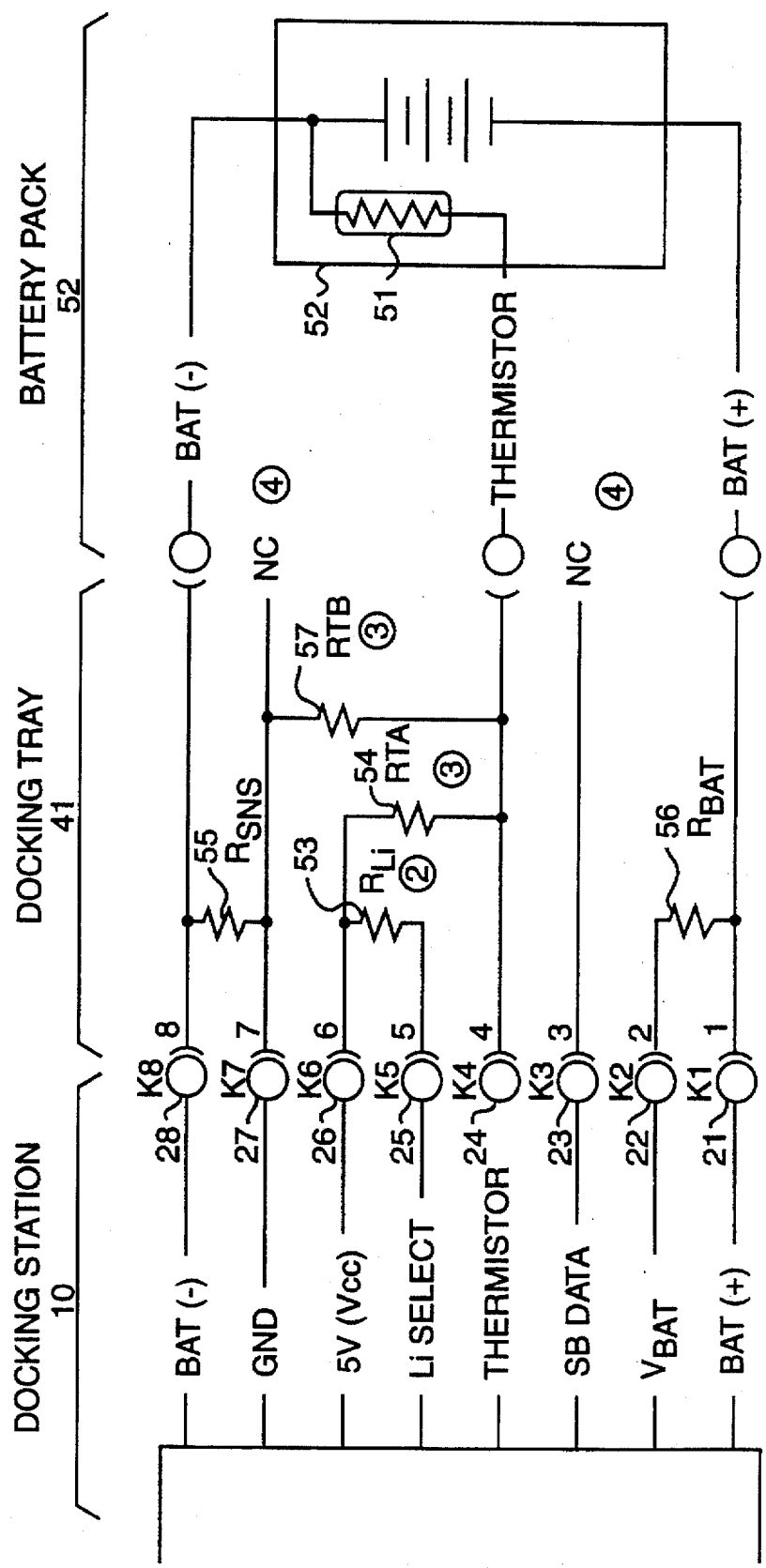
FIG. 3 is a schematic diagram of the circuit connections to the battery charger as provided by the docking tray.

The presence or absence of any particular one of contactors 1–8 on docking tray 41, or the bridging of two of them together by associated circuitry, are an aspect of the programming of the recharging process according to a particular docking tray. For example, the schematic illustration of FIG. 3 is specifically for the case of AA size Li/Li-ion batteries. The engagement of contactors 1–8 with interface contacts 21–28 is readily seen. In this case, the charging current flows from electronics 13 through contact 21 through contactor 1, through the battery, through current sensing resistor 55 and then through contactor 7 and contact 27 back to electronics 13. The value of sense resistor 55 determines the charging current that flows through the battery. The voltage product of sense resistor 55 and the charging current returns to the electronics 13 through contactor 8 and contact 28 where it is used to regulate the charging current. Contact 22 and contactor 2, together with resistor 56 connected between contactors 1 and 2 provide the electronics 13 with a voltage indicating the battery's condition of charge or discharge. Contact 23 and contactor 3 are a provision for future batteries incorporating a proposed "smart battery" serial data bus.

Contact 24 and contactor 4 connect electronics 13 to a temperature sensing thermistor 51, which senses the temperature of the case of battery 52. In most multi-cell batteries such as the battery 52 shown in FIG. 3, the battery manufacturers have incorporated a de facto standard, 10,000 ohm negative-temperature-coefficient (NTC) resistor 51 in the assembly. Resistors 54 and 57 are required only when the battery utilizes a non-standard thermistor. As illustrated, contactors 5 and 6 are connected by resistor 53 on docking tray 41 for AA size Li/Li-ion batteries.

In all other cases involving docking trays for Li/Li-ion batteries, contactors 5 and 6 will be directly connected.

For NiCd and NiMH docking trays, contactors 5 and 6 are not connected.

The adaptations possible in the circuitry of each different docking tray 41 are merely hinted at by the previous description. The docking tray 41, in a particular instance, can adapt the charging process for different terminal voltages, different charging currents, different charge termination methods and different detection sensitivities. The essential principle is that all adaptations affecting the charging of a particular battery should be placed on docking tray 41. Other specific examples of adaptations for the generic docking tray 41 of FIG. 2 are shown in FIGS. 7, 8, and 9.

Figure 7:
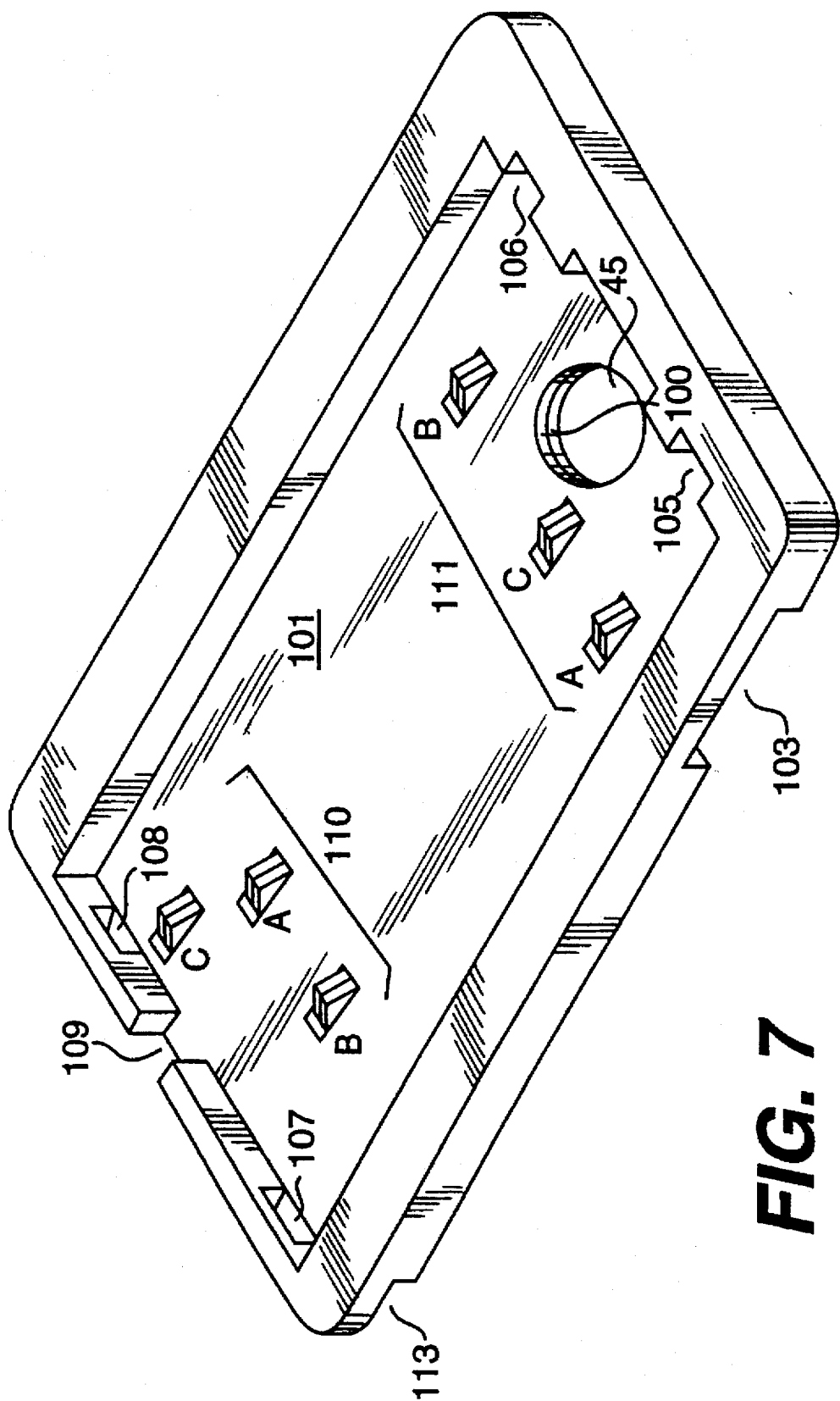
FIGS. 7, 8, and 9 are perspective views of alternative docking trays, differing in part from that of FIG. 2, according to the invention.
Figure 8:
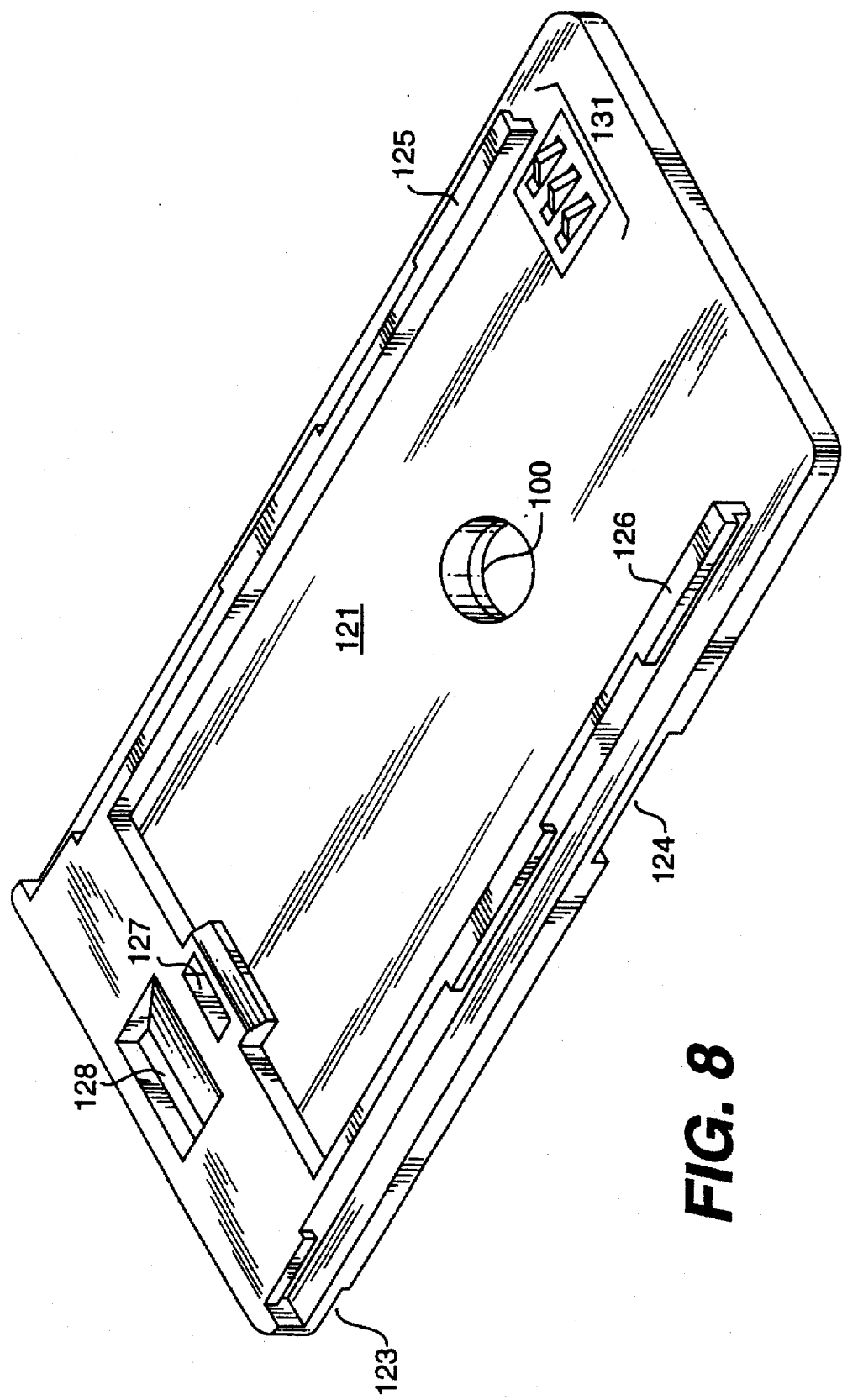
Figure 9:
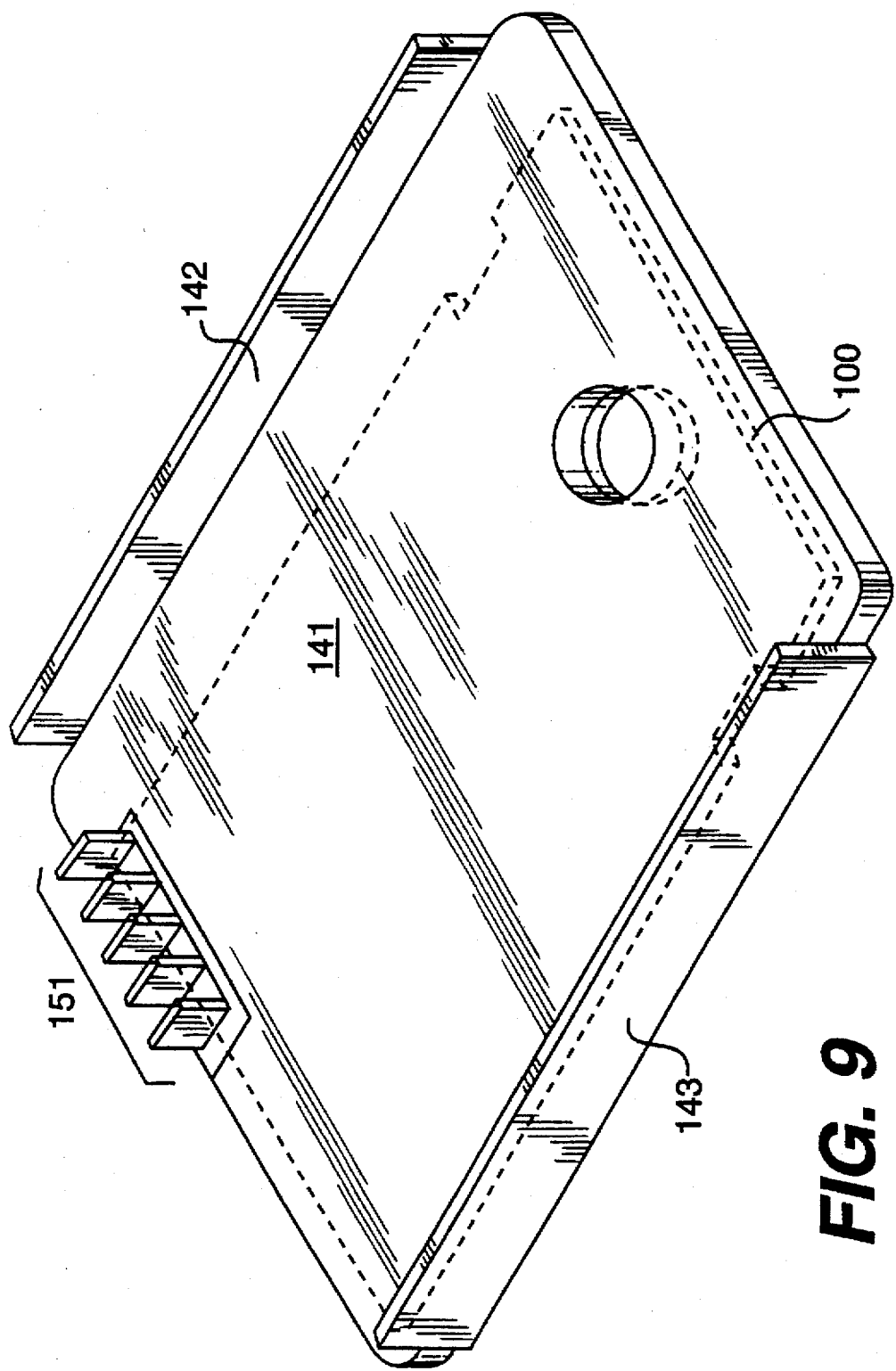

The docking trays of FIGS. 7, 8, and 9 are mountable to charger main body 11 in the same manner previously described for mounting docking tray 41 of FIG. 2. External dimensions (except overall length), notches 43 and 44, latch mating hole 45 and contactors 1–8 on the underside of the docking tray 41 circuit board are identical for all docking tray adaptations. Each battery-specific adaptation of docking tray 41, which includes programmable circuitry and battery mating contacts or connector, is mounted on the top side of the docking tray 41 circuit board 100 which is then bonded or otherwise permanently attached to the appropriate plastic battery holder 101. All docking tray circuitry except battery mating contacts 110 and 111 and contactors 1–8 (on the underside) are enclosed or otherwise hidden by the plastic battery holder 101.

FIG. 7 illustrates a docking tray suitable for charging a 6-volt NiCd or NiMH battery for VHS-C and 8 mm camcorders such as those manufactured by Panasonic, Sony, Nikon, JVC and others. The battery is positioned and retained by slots and notches 105–109 in the plastic battery holder 101. Electrical connection to the battery is made by an exposed array of flexible contacts fastened to and connected on circuit board 100 of docking tray 41 and protruding through openings in the plastic battery holder 101.

Contact array 110 is used for an 8 mm camcorder battery and contact array 111 for a VHS-C camcorder battery. Contact 110A or 111A engages the positive (+) battery terminal, contact 110B or 111B engages the negative (−) battery terminal and contact 110C or 111C engages the thermistor. Recesses 103 and 113 in battery holder 101 provide clearance for retaining tabs 33 and 36 in charger main body 11 when the docking tray is engaged. Similar recesses (not shown in FIG. 7) on the opposite side of battery holder 101 similarly provide clearance for retaining tabs 34 and 37 in the main charger body 11.

FIG. 8 shows a docking tray configured to charge a 6-volt Motorola flip-phone battery, either NiCd or NiMH. The battery is positioned by sliding it between flanged guides 125 and 126 on battery holder 121 until a latch (not shown in FIG. 1) on the battery housing engages detents 127 and 128 in battery holder 121. When positioned, exposed terminals on the battery are mated to contact array 131 on the docking tray. Clearance recesses 123 and 124 in battery holder 121 are functionally identical to recesses 113 and 103 respectively as illustrated and described for FIG. 7.

In FIG. 9, a Duracell® "DR30" 7.2-volt NiMH computer battery is positioned for charging in battery holder 141 by side rails 142 and 143 and connector 151.

It will be noted that the batteries accommodated by the docking trays of FIGS. 8 and 9 are both larger in one or more dimensions than docking bed 12 of docking station 10. Advantageously, a feature of the preferred embodiment is that the charging apparatus imposes no constraints on the physical size of the battery to be charged.

Also, it will be noted that the batteries accommodated by the docking trays of FIGS. 7, 8, and 9 and schematically shown in FIG. 3 are multi-cell packs, each having an internally mounted temperature-sensing thermistor 51. Other docking tray adaptations, particularly examples accommodating a plurality of individual battery cells, may have the thermistor permanently attached to the docking tray itself or may omit the thermistor and use an alternative method to sense charge completion.

Figure 4:
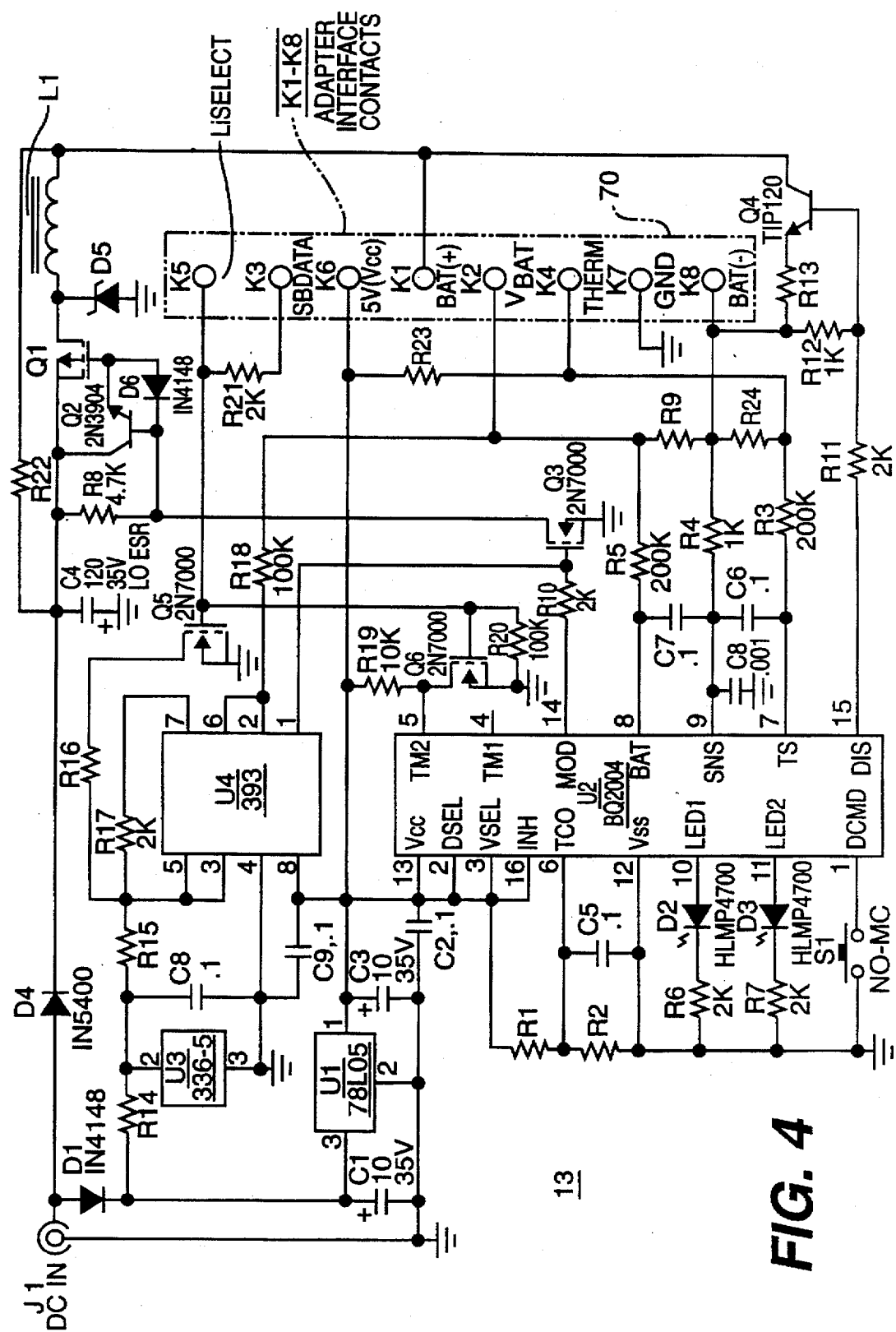
FIG. 4 is a schematic diagram of the internal electronics of the docking station.

The charge control electronics 13 of the charger main body 11 of docking station 10 are schematically illustrated in FIG. 4. Advantageously, electronics 13 comprise the portion of the circuitry that does not change when the adapter docking trays are changed.

In FIGS. 3 and 4, the adapter interface contacts 21–28 are also labeled as terminals K1–K8 and shown together as terminal block 70. Battery charging current is delivered to contactors 1 and 8 of docking tray 41 through terminals K1(+) and K8(−) respectively. System ground at K7 is connected to docking tray 41 through contactor 7. Resistor $R_{sns}$ 55 of FIG. 3, connected between contactors 7 and 8, sets the charge current and generates a sense voltage at K8. A scaled voltage representing the actual battery voltage is derived from a resistive divider comprised of $R_{bat}$ 56 of FIG. 3 and R9 of FIG. 4 and delivered to K2. A voltage at K4 indicating both the absolute value and the rate of change of the battery temperature is derived from a resistor network typically consisting of R23 and R24 as shown in FIG. 4 and a thermistor 51 mounted on battery 52 as shown in FIG. 3. Terminal K6 delivers 5 volts to contactor 6 of docking tray 41 where it may optionally be connected to contactor 5 and then return to KS. When docking tray 41 contactors 5 and 6 are connected together on docking tray 41, additional circuitry required to charge LI-ion batteries is activated in charger main body 11.

In FIG. 4, charge control circuit U2 provides the means by which most charging functions are initiated and monitored.

For the preferred embodiment, tri-state programming inputs VSEL, TM1 and TM2 are configured to implement a fast-charge regimen that is terminated when the rate of change of the temperature-representing sense voltage, $\delta T/\delta t$, (from K4 to the TS pin of U2) exceeds a value internally set by U2. Alternatively, fast charging is also terminated when the voltage from K2 to the BAT pin of U2, when periodically sampled by circuitry internal to U2, does not increase in value during the sample period (0δV). After fast charge termination, a ⅛ power "top-off" charge followed by a very low power "trickle charge" continues for time periods determined by the states of TM1 and TM2.

The absolute value of the voltage measured at the BAT pin is also used by the circuit U2 to detect the presence or absence of a chargeable battery, to sense the end-of-discharge voltage of a battery being discharged before charging and, by comparing the BAT voltage with internally generated reference voltages, to detect minimum and maximum battery voltage fault conditions. The absolute value of the voltage measured at the TS pin is similarly used by U2 to detect the presence or absence of a thermistor and, by internally comparing the TS voltage with a voltage provided at the TCO pin by a resistive divider comprised of R1 and R2, to detect minimum and maximum temperature fault conditions.

Further, in FIG. 4, a switch mode buck regulator, comprised of power switching FET Q1, driver transistor Q2, inductor L1 and Schottky rectifier D5, provides regulated DC current to terminal K1 and thus to the battery being charged. Q1 switches on and off while charging a battery, causing the energy stored in and released from L1 to modulate the sense voltage at terminal K8. The sense voltage at terminal K8 is also connected to the SNS pin of circuit U2.

A fixed threshold comparator internal to U2 detects the high and low threshold values of the modulated sense voltage thereby causing the comparator output to alternately switch to a high or low state. The comparator output, internally connected to the MOD pin of U2, then drives FET switch Q3 which in turn drives Q2 to turn the power FET Q1 on and off. The regulated current is thereby achieved.

It is noted that the input and filter circuit U1 can be supplied with direct current at terminal J1 from an unfiltered DC source or from a source battery at the recharging site.

A discharge-before-charge switch 15 on docking station 10 in FIG. 1 is represented schematically by S1 in FIG. 4. Switch S1, when manually actuated, momentarily causes the DCMD pin of U2 to go from a high to a low state and thereby, through circuitry internal to U2, terminates all charging modes in progress and, further, changes the state of the DIS pin of U2 from low to high thereby turning on Darlington power transistor Q4. A battery, removably mounted in a docking tray but connected in parallel with transistor Q4 at terminals K1 and K8, is then discharged through Q4 at a constant current rate determined by resistor R13. When the voltage measured at the BAT pin of U2 reaches a value equal to the minimum voltage reference internal to U2, discharging is terminated and fast charging is automatically initiated.

In the preferred embodiment, discharge-before-charge is a user selectable function. It should be noted, however, that this function may also be initiated automatically or omitted entirely. Use of this function does, in some cases, restore usable battery capacity lost as a result of repeated shallow discharge cycles or extended periods of low current overcharge.

Status LED 1 and Status LED 2, illustrated in FIG. 1, are represented schematically by D2 and D3 respectively in FIG. 4. The anodes of D2 and D3 are connected to and driven by the LED1 and LED2 pins of U2. The display mode is selected by the DSEL tri-state programming input of U2.

Linear regulator U1 provides the 5 volt power required for charge control circuit U2, comparator U4 and FET switch Q6. DC input jack J1 provides the unregulated DC power required by the switching regulator, linear regulator U1 and precision 5 volt reference U3. Protection from accidental polarity reversal is provided by rectifiers D1 and D4.

In order to charge Li/Li-ion batteries, several adaptive modifications to the charge control circuits previously described are required. Advantageously, the preferred embodiment implements these modifications by simply mounting an appropriately configured docking tray 41 as shown in FIG. 3 to the docking bed 12 of docking station 10 shown in FIG. 1.

In the case of NiCd and NiMH batteries already discussed, the scaled battery voltage appearing at terminal K2 and connected to the BAT pin of U2 is compared with internal reference voltages generated by U2 to detect minimum and maximum battery voltage fault conditions. When charging Li/Li-ion batteries, the scaled battery voltage at terminal K2 also becomes the primary means of charge control and, in conjunction with certain programmable functions of U2, the primary means of charge termination. Further details of circuit adaptations for charging Li/Li-ion batteries are as follows.

Terminal K5 is connected to terminal K6 by low-resistance connection $R_{Li}$ 53 on docking tray 41 of FIGS. 2 and 3. This completed circuit path connects the 5 volt regulated output of U1 to the gate junctions of FET switches Q5 and Q6 thereby turning the FET switches "on" and effectively shorting the drain-source junctions. Turning FET Q5 "on" closes the circuit from precision 5 volt reference U3 through divider resistors R15 and R16 to system ground. The reference voltage thus produced at the juncture of R15 and R16 is connected to the non-inverting input of comparator U4 where it is compared with the scaled battery voltage connected from terminal K2 to the inverting input of U4. The output of comparator U4 drives the gate junction of FET switch Q3 causing charge current to be shut off whenever the scaled battery voltage at K2 is greater than the U4 reference voltage. In effect, turning FET Q5 "on" changes the 4 volt maximum cell voltage reference internal to U2 to the 2.8 volt externally set reference voltage which is optimum for most Li/Li-ion batteries. Turning FET Q6 "on" changes the state of programming input TM2 of U2 from high to low thereby changing the time-out period from 39 to 154 minutes and disabling top-off charging.

Since Li/Li-ion batteries do not communicate detectable and/or repeatable data indicating time rate of change of temperature or time rate of change of terminal voltage as do NiCd and NiMH batteries, primary charge termination is based solely on total elapsed time while the intended maximum charging voltage is delivered by the charger.

The foregoing example of the charging changes implemented by one simple change in connections at the pertinent adaptive docking tray is merely illustrative of the significant changes possible by the mounting of a docking tray on docking bed 12. Nevertheless, the portion of the circuitry shown in FIG. 4 does not change.

The method of the invention includes the steps of engaging a docking tray with a docking bed of the charger main body to engage contactors exposed on the tray with contacts exposed on the bed and connected to the circuitry of the charger main body; connecting the battery to be charged to the circuit of the tray, which tray includes charging circuitry complementary to the circuitry of the charger main body and selected to determine charging parameters for charging a battery of a particular type and size; and executing an automatic charging process.

Figure 5:
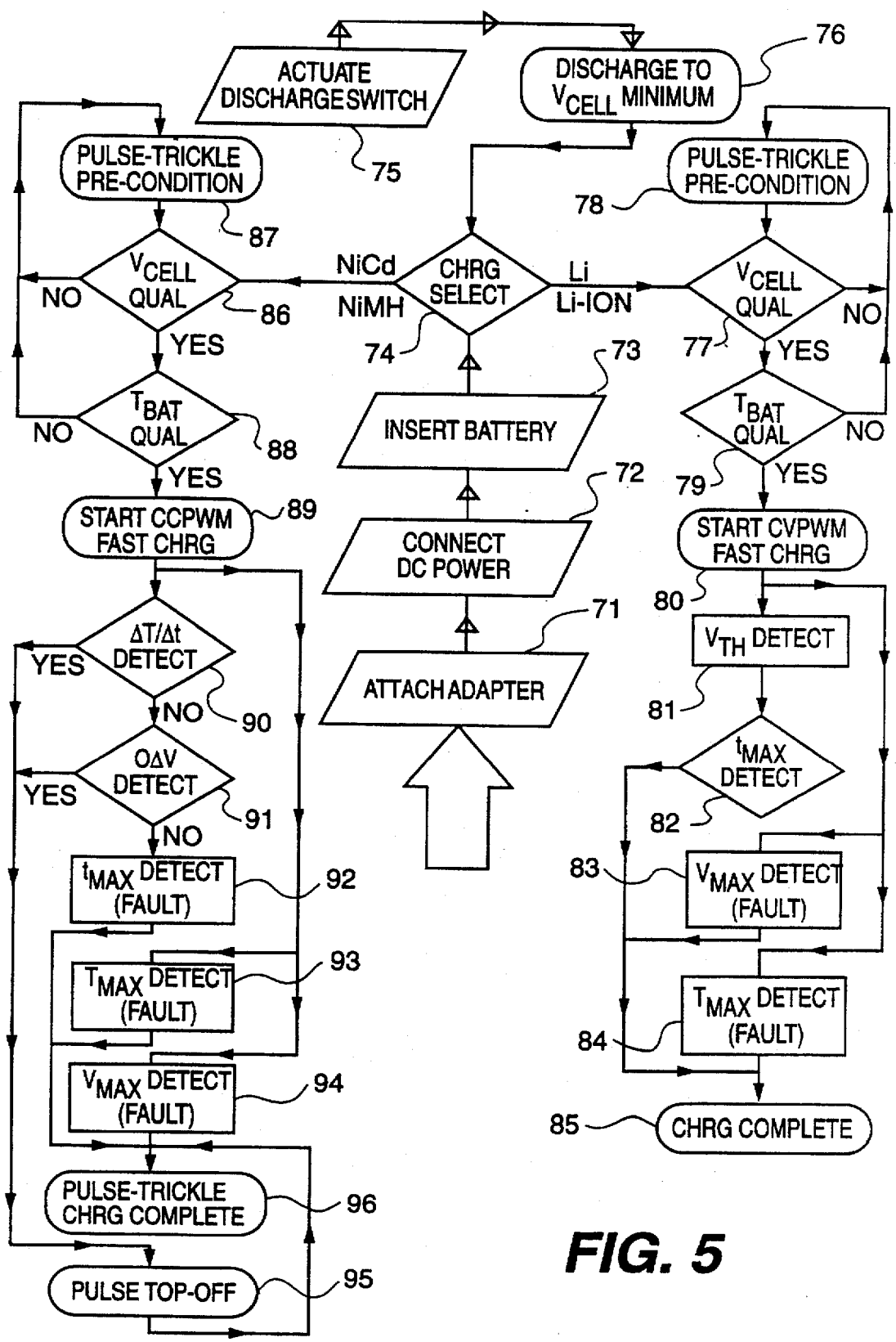
FIG. 5 is a bifurcated flow diagram of the method of using a battery charger according to the invention.

The method is then further executed according to the steps shown in FIG. 5.

In step 71, the adaptive docking tray is attached and latched onto the docking bed. Steps 72 and 73 may be executed in either order. The charging process automatically begins when the last step of connecting DC power or inserting the battery is completed. All charger functions except discharge-before-charge are initiated by connecting the battery to the docking tray or connecting a DC power plug to the electronics in the charger main body. Each charging stage begins and ends automatically without user intervention. Two LEDs visually indicate charging status and fault conditions.

At step 74, the decision to proceed through the steps for Li/Li-ion batteries or through the steps for NiCd/NiMH batteries occurs automatically in accordance with the type of docking tray attached. An integrated circuit in the programmable electronics of the docking station provides δT/δt charge termination for NiCd and NiMH batteries with thermistors and 0δV termination for batteries without thermistors, as indicated by the particular docking tray engaged. In addition, the integrated circuit provides time-based proportional control of both top-off and trickle charging (charge maintenance) phases, as will be seen in the respective portions of the flow diagram of FIG. 5. As an additional precaution, the charge control system verifies battery voltage, temperature and polarity before commencing fast charge.

According to the Li/Li-ion steps, at steps 77 and 79 cell voltage and temperature are measured and the battery is preconditioned at step 78 if fast charge qualification conditions are not within acceptable limits. Preconditioning employs pulse-trickle charging like that of pulse-trickle charge maintenance.

When voltage and temperature conditions are acceptable, constant voltage pulse width modulated fast charging begins at step 80.

At step 81, charging voltage is monitored to ensure that a regulated threshold voltage, $V_{TH}$, appropriate for charging a Li/Li-ion battery is present. That charging voltage is continuously delivered until the programmed time period, $t_{MAX}$, of step 82 has elapsed, at which time charging is terminated at step 85. Charging may also be terminated at step 85 before $t_{MAX}$ if either of the fault conditions, excessive voltage $V_{MAX}$, or battery temperature, $T_{MAX}$, are detected at steps 83 and 84.

For NiCd and NiMH batteries, such as those mounted in battery holders 101, 121 and 141 illustrated by FIGS. 7, 8 and 9, attaching the docking tray to the docking bed involves the alternative sequence of steps at the left hand side of FIG. 5. Battery qualification and preconditioning steps 86–88 are the same as steps 77–79, respectively. Upon verification of acceptable battery voltage and temperature conditions, constant current pulse width modulation fast charging begins at step 89. One should note the essential difference between step 89 and step 80, i.e., constant current pulse width modulation versus constant voltage pulse width modulation.

At steps 90 and 91, fast charging is terminated upon detection of either δT/δt or 0δV signals. Although both methods of charge termination are continuously active during fast charging, the trigger point of δT/δt termination is always set to precede 0δV termination. As a result, 0δV detection normally occurs only when the battery does not have a thermistor. At step 95, after fast charge termination, pulse top-off charging at ⅛ the fast charge rate proceeds for a programmable time period followed by pulse-trickle charge maintenance charging at step 96 signifying charge completion.

Time, temperature and voltage fault conditions detected at steps 92, 93 and 94 respectively, terminate both fast or top-off charging and end all charging at step 96.

At step 75, manually actuating discharge-before-charge switch 15 of FIG. 1 interrupts all charging activity and begins the discharge process at step 76. When the battery is discharged to a voltage detected as $V_{CELL}$ minimum at step 77 or 86, discharging ends and the charging process automatically begins.

The status indicator lights LED 1 and LED 2 of FIG. 1 operate as shown in the logic table of FIG. 6. Basically, LED 1 goes on only on completion of charging. LED 2 flashes on and off during discharge, is continuously on during fast charging, and is off when charging is complete.

It will be apparent to those skilled in the art that various modifications and variations can be made in the arrangements of the present invention and in the associated method without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An apparatus for charging rechargeable batteries of differing types and sizes, comprising:
    a charger main body comprising a docking station including
        a docking bed and
        programmable electronics including an array of contacts exposed at the docking bed;
    a first docking tray engageable with the docking bed and including
        means for connecting a rechargeable battery of one type and size to a pair of electrical battery contacts and
        an array of contactors at least two of which are connected with the pair of electrical battery contacts, the array of contactors and associated circuitry being arranged on a surface of the first docking tray to contact, upon engagement of the first docking tray with the docking bed, the array of exposed contacts to program the programmable electronics for charging of the rechargeable battery.

2. The apparatus for recharging rechargeable batteries according to claim 1, further including a second docking tray interchangeable with the first docking tray, the first and second docking trays and the main charger body being portable together.

3. The apparatus for recharging rechargeable batteries according to claim 1, further including a plurality of additional docking trays interchangeable with the first docking tray, the first docking tray, the plurality of additional docking trays, and the main charger body being portable together and providing adaptability for charging a plurality of additional batteries respectively differing from each other and from the battery of one type and size.

4. The apparatus for recharging rechargeable batteries according to claim 1, further including
    means for providing snappable engagement of the docking tray with the docking bed.

5. The apparatus for recharging rechargeable batteries according to claim 1, wherein
    the docking tray has a plurality of battery connecting means for connecting to one of the batteries of differing types and sizes and the array of contactors include a pair of contactors interconnected with each of the plurality of the connecting means.

6. The apparatus for recharging rechargeable batteries according to claim 3, further including
    means on each one of the trays for connecting a respective one of the plurality of batteries to the pair of electrical battery contacts.

7. The apparatus for recharging a rechargeable battery according to claim 6, wherein the respective battery is mounted on the one tray.

8. The apparatus for recharging rechargeable batteries according to claim 1, further including means responsive to a selection by the user for partially discharging the battery prior to commencement of charging.

9. The apparatus for recharging rechargeable batteries according to claim 1, wherein
    the docking tray includes means for sensing a temperature of the battery to produce a temperature signal and
    the programmable electronics of the docking station includes means for determining a rate of change of the temperature of the battery in response to the temperature signal and means for determining the rate of charging of the battery at least partly in relation to the determined rate of change of temperature of the battery,
    the sensing means being connected to the charge rate determining means through one of the exposed contacts of the docking station.

10. The apparatus for recharging rechargeable batteries according to claim 9, wherein a respective one of the array of contactors contacts the one exposed contact through which the sensing means is connected to the charge rate determining means, and means for adapting the sensed signal for the respective battery is connected to the respective one contactor.

11. The apparatus for recharging a rechargeable battery according to claim 1, wherein
    the docking tray includes means for sensing terminal voltage of the battery and
    the programmable electronics of the docking station includes means for determining a rate of change of the terminal voltage of the battery and means for determining the rate of charging of the battery at least partly in relation to the determined rate of change of terminal voltage of the battery,
    the voltage sensing means being connected to the charge rate determining means through one of the exposed contacts of the docking station.

12. The apparatus for recharging rechargeable batteries according to claim 11, wherein a respective one of the array of contactors contacts the one exposed contact through which the voltage sensing means is connected to the charge rate determining means, and means for adapting the sensed signal for the respective rechargeable battery is connected to the respective one contactor.

13. The apparatus for recharging a rechargeable battery according to claim 1, wherein
    the first docking tray includes means for sensing a temperature of the battery and the programmable electronics of the docking station includes means for determining the rate of change of the temperature of the battery and means for determining the rate of charging of the battery at least partly in relation to the determined rate of change of temperature of the battery, the temperature sensing means being connected to the charge rate determining means through one of the docking station programming contacts, and wherein still further the docking tray includes means for sensing terminal voltage of the battery and the docking station programmable electronics includes means for determining the rate of change of the terminal voltage of the battery and means for determining the rate of charging of the battery, as a backup for the determined temperature charge rate, at least partly in relation to the determined battery terminal voltage charge rate, the means for sensing terminal voltage being connected to the battery terminal voltage charge rate determining means through a second contact of the docking station programming contacts.

14. An apparatus for rapidly charging a battery comprising:

temperature sensing means, coupled to the battery, for sensing and producing a signal responsive to a temperature of the battery;

signal means, connected to the temperature sensing means, for providing a signal representative of a rate of change of the temperature;

charge control means, connected to the signal means and including first and second charging circuits, the first charging circuit being adapted to charge the battery at a first rate when the signal from the signal means is below a predetermined amplitude, the second charging circuit being adapted to charge the battery at a second rate when the signal is above the predetermined amplitude, wherein:

a docking station having a docking bed and exposed contacts in the docking bed contains the signal means and the charge control means and a docking tray, adapted to releasably engage the docking bed, receives the rechargeable battery, contains the temperature sensing means, and provides electrical connections and electrical circuits from the battery to electrical contactors that engage a plurality of the exposed contacts to connect the first charging circuit to the battery and the second charging circuit to the battery and thereby to determine the first and second charging rates for the battery when the docking tray is engaged with the docking bed of the docking station.

15. The apparatus for rapidly charging a battery according to claim 14, further including:

means for providing snappable engagement of the docking tray with the docking bed.

16. The apparatus for rapidly charging a battery according to claim 14, wherein:

the docking tray has a plurality of battery connecting means for receiving at respective sets of contacts respective ones of the batteries; and the array of contactors includes a pair of contactors interconnected with each of the respective sets of contacts.

17. The apparatus for rapidly charging a battery according to claim 14, further including:

a plurality of additional docking trays portable with the main charger body and the first docking tray, each of the additional docking trays being individually engageable with the docking bed and including an array of contactors, a pair of which are arranged to be connected with the battery, the array of contactors being arranged on an exterior surface of the tray to contact, upon engagement of the first tray with the docking bed, the exposed contacts.

18. The apparatus for rapidly charging a battery according to claim 14, wherein:

a plurality of the first and additional docking trays are adapted for Li/Li-ion batteries and for NiMH batteries.

19. The apparatus for rapidly charging a battery according to claim 14, further including means responsive to a selection by the user for partially discharging the battery prior to commencement of charging.

20. The apparatus for rapidly charging a battery according to claim 14, wherein:

the docking tray includes means for sensing terminal voltage of the battery and the electronics of the docking station includes means for determining a rate of change of the terminal voltage of the battery and means for determining a rate of charging of the battery at least partly in relation to the determined rate of change of terminal voltage of the battery, the means for sensing being connected to the means for determining through one of the exposed contacts of the docking station.

21. The apparatus for rapidly charging a battery according to claim 20, wherein:

the means for determining the rate of change of terminal voltage is subordinated to and is used as a backup for the means for sensing the temperature of the battery and the means for providing the signal representative of the rate of change of the temperature.

22. A method of charging a battery with a charger including a main charger body with charging circuitry having elements usable for charging a plurality of batteries of different types and sizes, the method comprising the steps of:

engaging a docking tray with a docking bed of the main charger body to engage contactors exposed on the tray with contacts exposed on the bed and connected to the circuitry of the main charger body, the tray including charging circuitry complementary to the circuitry of the main charger body and selected to determine charging parameters for charging a battery of a particular type and size;

connecting the battery to be charged to the charging circuitry of the tray; and executing an automatic charging process.

23. The method of charging a battery according to claim 22, wherein the circuitry of the tray includes sensing circuitry for generating a first signal indicating charging of the battery, the circuitry of the main charger body includes circuitry for generating a second signal indicating a rate of change of the first signal, and the step of executing the automatic charging process includes the steps of generating the first signal and generating the second signal.

24. The method of charging a battery according to claim 23, wherein
the step of generating the first signal comprises steps of sensing a temperature associated with the battery and generating a signal indicative of the temperature.

25. A method of rapidly charging a battery comprising the steps of:
sensing the temperature of the battery and producing from that sensing an electrical signal representative of the rate of change of sensed temperature;
applying a charging current of a first level to the battery as long as the produced electrical signal remains below a predetermined value and reducing the charging current when the new electrical signal exceeds the predetermined value;
determining the first level of charging current in dependence upon a charging parameter, the charging parameter being determined by a docking tray having a first array of contacts engageable with a second array of contacts of a charger main body, the charger main body having a docking station including a docking bed with which the docking tray engages and at which the second array of contacts are exposed, engagements of the first and second arrays of contacts occurring when the tray is engaged with the bed; and
engaging the docking tray with the docking bed.

26. The method of rapidly charging a battery according to claim 25, wherein:
the step of applying a charging current is preceded by a step of discharging the battery partially in dependence on the type of battery.

27. The method of rapidly charging a battery according to claim 26, wherein:
the step of discharging the battery depends in part upon a circuit parameter associated with a particular type and size of the battery.

28. The method of rapidly charging a battery according to claim 26, wherein:
the step of discharging the battery depends in part upon and includes a step of evaluating a selection by the user.

29. The method of rapidly charging a battery according to claim 25, wherein:
the step of applying a charging current further includes a step of determining a rate of change of terminal voltage and evaluating that rate of change of voltage in relation to the rate of change of temperature.

30. The method of rapidly charging a battery according to claim 29, wherein:
the step of determining a rate of change of terminal voltage and evaluating that rate of change of voltage is affected by a parameter associated with a particular type and size of the battery.

31. The method of rapidly charging a battery according to claim 25, further including the step of determining the need for and amount of charging current to maintain a charged condition of the battery.

32. The method of rapidly charging a battery according to claim 31, wherein the step of determining the need for and amount of charging current to maintain a charged condition depends at least in part on a parameter associated with a particular type and size of the battery.

* * * * *